(12) United States Patent
Kito et al.

(10) Patent No.: US 9,267,047 B2
(45) Date of Patent: Feb. 23, 2016

(54) INK COMPOSITION FOR FORMING CLEAR LAYER, METHOD OF APPLYING THE SAME, AND PRINTED ARTICLE USING THE SAME

(75) Inventors: Katsuyuki Kito, Ibaraki (JP); Hideyuki Tanaka, Ibaraki (JP); Sadamu Kuse, Ibaraki (JP); Yoshiro Nishimura, Ibaraki (JP)

(73) Assignee: HITACHI MAXELL, LTD., Ibaraki-Shi, Osaka (JP)

( * ) Notice: Subject to any disclaimer, the term of this patent is extended or adjusted under 35 U.S.C. 154(b) by 0 days.

(21) Appl. No.: 13/581,203

(22) PCT Filed: Sep. 13, 2010

(86) PCT No.: PCT/JP2010/065726
§ 371 (c)(1),
(2), (4) Date: Sep. 7, 2012

(87) PCT Pub. No.: WO2011/104914
PCT Pub. Date: Sep. 1, 2011

(65) Prior Publication Data
US 2013/0004744 A1 Jan. 3, 2013

(30) Foreign Application Priority Data
Feb. 26, 2010 (JP) ................. 2010-042617

(51) Int. Cl.
*C08F 2/46* (2006.01)
*C08G 61/04* (2006.01)
*C09D 11/38* (2014.01)
*C09D 11/101* (2014.01)
*B41M 7/00* (2006.01)

(52) U.S. Cl.
CPC ............. *C09D 11/38* (2013.01); *B41M 7/0045* (2013.01); *C09D 11/101* (2013.01); *Y10T 428/24802* (2015.01)

(58) Field of Classification Search
CPC ............ C09D 11/10; B32B 3/10; B05D 5/00; C08K 5/5419
USPC .................................................. 522/1; 520/1
See application file for complete search history.

(56) References Cited

U.S. PATENT DOCUMENTS

| 7,891,799 B2 * | 2/2011 | Edwards et al. ............... 347/100 |
| 2003/0083396 A1 | 5/2003 | Ylitalo et al. |
| 2009/0227733 A1* | 9/2009 | Miura ............................ 524/603 |
| 2011/0236647 A1* | 9/2011 | Tsuchiya et al. ............. 428/195.1 |

FOREIGN PATENT DOCUMENTS

| EP | 2053100 A1 | 4/2009 |
| JP | 5-51550 A | 3/1993 |
| JP | 2004-189823 A | 7/2004 |
| JP | 2004-256699 A | 9/2004 |
| JP | 2004-536925 A | 12/2004 |
| JP | 2006-181801 A | 7/2006 |
| JP | 2007-031667 | * 2/2007 |
| JP | 2007-31667 A | 2/2007 |
| JP | 2008-68516 A | 3/2008 |
| JP | 2009-507692 A | 2/2009 |
| WO | WO 2006/008441 A1 | 1/2006 |
| WO | 2007/033031 | * 3/2007 |
| WO | WO 2007/033031 A2 | 3/2007 |
| WO | 2009/053283 | * 4/2009 |
| WO | 2009/053348 | * 4/2009 |
| WO | 2009/148124 | * 10/2009 |
| WO | WO 2009/148124 A1 | 12/2009 |

OTHER PUBLICATIONS

Saito et al, 2007-031667 Machine translation, Feb. 8, 2007.*
Saito et al, JP 2007-031667 Machine Translation, Feb. 8, 2007.*
International Search Report issued in International Patent Application No. PCT/JP2010/065726, dated Nov. 2, 2010.
The Decision of Refusal, dated Jul. 1, 2014, issued in the corresponding Japanese Patent Application 2010-042617.
The Office Action, dated Jul. 9, 2013, issued in the corresponding Japanese Patent Application No. 2010-042617.
The Communication with an extended search report, dated Aug. 1, 2014, issued in the corresponding European Patent Application No. 10846577.4.
A partial English translation of the Decision of Refusal, dated Jul. 1, 2014, issued in the corresponding Japanese Patent Application No. 2010-042617.
A partial English translation of the Office Action, dated Jul. 9, 2013, issued in the corresponding Japanese Patent Application No. 2010-042617.

* cited by examiner

*Primary Examiner* — Ling Choi
*Assistant Examiner* — Jessica E Whiteley
(74) *Attorney, Agent, or Firm* — Birch, Stewart, Kolasch & Birch, LLP

(57) ABSTRACT

Disclosed is an ink composition for clear layer formation having excellent adhesion properties on substrates, recording layers, and clear layers, as well as excellent overcoat characteristics and refinishing properties. Further disclosed are a coating method for the ink composition, and a printed article formed using the ink composition. The ink composition for clear layer formation is used for forming at least one clear layer on a substrate, or on a printed article on which a printed coating film is formed on a substrate as a recording layer. The ink composition for clear layer formation is characterised in that: the surface free energy of the substrate is 30-45 (mJ/m$^2$); the surface free energy of the recording layer is 40-50 (mJ/m$^2$); the contact angle of the ink composition to the substrate is 30-65 degrees, the contact angle of the ink composition to the recording layer is 40-55 degrees, and the contact angle of the ink composition to the clear layer is 45-60 degrees.

10 Claims, 1 Drawing Sheet

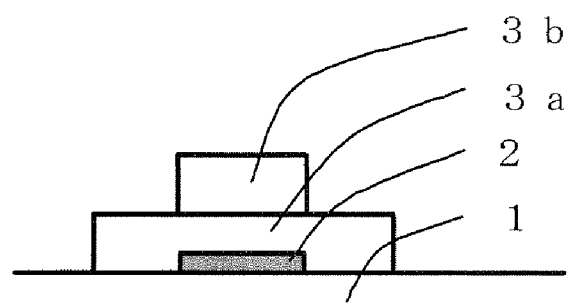

INK COMPOSITION FOR FORMING CLEAR LAYER, METHOD OF APPLYING THE SAME, AND PRINTED ARTICLE USING THE SAME

TECHNICAL FIELD

The present patent application claims the priority of Japanese Patent Application No. 2010-42617, entirety of which is incorporated herein by reference, under the Paris Convention.

The present invention relates to an ink composition for forming a clear layer excellent in refinishing properties, more particularly to an energy ray-curable ink composition for forming a clear layer excellent in refinishing properties, which is preferably used in a clear layer for covering an image such as a character, a mark, a pattern or a figure formed on a recording medium using an ink-jet ink, and to a method of applying the same and a printed article formed using the same.

BACKGROUND ART

In order to improve scratch resistance of a recording layer and impart gloss, overcoating of a clear layer on the recording layer (solid coating) is performed. In this case, as properties which are required of the clear layer, glossiness (wettability), hard coating property (hardness), and non-yellowing property (non-discoloring property, transparency) can be mentioned.

In recent years, in order to further enhance design characteristics of the recording layer, it is required to create high image quality by forming a clear layer only on a recording layer (printing) portion to impart gloss, or double coating with a clear layer only on a recording layer (printing) portion to form a thick-coated portion, thereby, imparting three-dimensionality (e.g. Patent Documents 1 and 2).

Patent Document 1 proposes, in a method of double coating with an energy ray-curable ink composition by forming a printed coating film on a member to be recorded using an energy ray-curable ink composition for ink-jet recording and, thereafter, forming a clear coating film on the coating film using an energy ray-curable clear ink composition for ink-jet, a method of double coating with an energy ray-curable ink composition excellent in refinishing properties by defining a preferable range of surface tension of an energy ray-curable ink composition for ink jet recording to be applied as a lower layer and defining a certain relationship also with surface tension of an energy ray-curable clear ink composition for ink-jet recording to be applied as an upper layer.

In addition, Patent Document 2 proposes a printing system for applying a first ink-jet ink containing reflecting metal particles to a substrate to provide a reflecting layer, and applying a second ink-jet ink thereon to provide a protective layer, and to define a relationship of the contact angle of an inkjet ink for forming a protective layer to a substrate and the reflecting layer thereupon.

PRIOR ART DOCUMENTS

Patent Documents

Patent Document 1: JP-A-2006-181801
Patent Document 2: JP-A-2009-507692

SUMMARY OF THE INVENTION

Problem to be Solved by the Invention

However, by the aforementioned prior art, sufficient refinishing properties of a clear layer have not been achieved yet.

An object of the present invention is to overcome the problem of the prior art and to provide an ink composition for forming a clear layer excellent in adhesiveness with any of a substrate, a recording layer and a clear layer, and also excellent in overcoating property and refinishing properties, and a method of applying the same, and a printed article formed by using the same.

Solutions to the Problem

The present inventors intensively studied and, as a result, found out that the object can be achieved by the means described below, resulting in completion of the present invention.

That is, the present invention includes the following preferable aspects.

[1] An ink composition for forming a clear layer which is used for forming at least one clear layer on a substrate or on a printed article in which a printed coating film as a recording layer is formed on a substrate, wherein
the surface free energy of the substrate is 30 to 45 $(mJ/m^2)$,
the surface free energy of the recording layer is 40 to 50 $(mJ/m^2)$,
the contact angle of the ink composition for forming a clear layer to the substrate is 30 to 65 degrees,
the contact angle of the ink composition for forming a clear layer to the recording layer is 40 to 55 degrees, and
the contact angle of the ink composition for forming a clear layer to the clear layer is 45 to 60 degrees.

[2] The ink composition for forming a clear layer according to [1], which contains a polymerizable composition, a photopolymerization initiator and a surface tension regulator.

[3] The ink composition for forming a clear layer according to [2], wherein the surface tension regulator contains a silicone compound.

[4] The ink composition for forming a clear layer according to [3], wherein the silicone compound has an ethylenic double bond in a molecule.

[5] The ink composition for forming a clear layer according to any one of [1] to [4], wherein the photopolymerization initiator contains at least an acylphosphine oxide compound.

[6] A printed article having a clear layer formed using the ink composition for forming a clear layer according to any one of [1] to [5].

[7] The ink composition for forming a clear layer according to any one of [1] to [5], wherein the surface free energy of a cured product of the ink composition for forming a clear layer is 40 to 43.4 $(mJ/m^2)$.

[8] A method of applying an ink composition for forming a clear layer, including forming at least one clear layer on a substrate or on a printed article obtained by forming a printed coating film as a recording layer on a substrate, using an ink composition for forming a clear layer, wherein
the surface free energy of the substrate is 30 to 45 $(mJ/m^2)$,
the surface free energy of the recording layer is 40 to 50 $(mJ/m^2)$,
the contact angle of the ink composition for forming a clear layer to the substrate is 30 to 65 degrees,
the contact angle of the ink composition for forming a clear layer to the recording layer is 40 to 55 degrees, and
the contact angle of the ink composition for forming a clear layer to the clear layer is 45 to 60 degrees.

Effects of the Invention

According to the present invention, there can be obtained an ink composition for forming a clear layer excellent in adhesiveness with any of a substrate, a recording layer and a clear layer, and excellent not only in overcoating property but also in refinishing properties at the time of solid coating with a clear layer on the recording layer.

In addition, excellent design characteristics can be imparted to a printed article by performing double coating using the ink composition for forming a clear layer in accordance with the present invention, and raising a specified position on an image to impart three-dimensionality or forming a pattern.

BRIEF DESCRIPTION OF THE DRAWING

FIG. 1 is a drawing showing one example of a printed article obtained by double coating with an ink composition for forming a clear layer of the present invention to form two clear layers.

MODE FOR CARRYING OUT THE INVENTION

The ink composition for forming a clear layer of the present invention is an ink composition which is used for forming at least one clear layer on a substrate or on a printed article in which a printed coating film as a recording layer is formed on a substrate, wherein the surface free energy of the substrate is 30 to 45 ($mJ/m^2$), the surface free energy of the recording layer is 40 to 50 ($mJ/m^2$), the contact angle of the ink composition for forming a clear layer to the substrate is 30 to 65 degrees, the contact angle of the ink composition for forming a clear layer to the recording layer is 40 to 55 degrees, and the contact angle of the ink composition for forming a clear layer to the clear layer is 45 to 60 degrees. By having such characteristics, an ink composition for forming a clear layer excellent in adhesiveness with any of a substrate, a recording layer and a clear layer, and also excellent in refinishing properties can be obtained.

The ink composition for forming a clear layer of the present invention is usually used for forming at least one clear layer directly on a substrate or on a printed article in which a printed coating film as a recording layer is formed on a substrate, using an energy ray-curable ink composition for ink-jet recording.

It is important, inter alia, from the viewpoint of printability of a recording layer that the substrate in the present invention has a surface free energy of 30 to 45 ($mJ/m^2$). When the surface free energy is low, there is a tendency that an ink is repelled upon formation of a recording layer and the dot diameter is not stabilized. From this viewpoint, it is desirable that the surface free energy is preferably 31 ($mJ/m^2$) or more, more preferably 33 ($mJ/m^2$) or more. On the other hand, when the surface free energy is high, there is a tendency that a dot of an ink for recording spreads too broadly and a blur is generated. From this viewpoint, it is desirable that the surface free energy is preferably 43 ($mJ/m^2$) or less, more preferably 41 ($mJ/m^2$) or less.

Examples of the substrate having a surface free energy in the aforementioned range include polypropylene (PP) which have been subjected to corona discharge treatment, polyethylene terephthalate (PET), polycarbonate (PC), polystyrene (PS), polyvinyl chloride (PVC), polyvinylidene chloride (PVDC), and an acrylonitrile-butadiene-styrene copolymer (ABS). The surface free energy of the substrate varies depending not only on selection of a material to be used as a substrate, but also on the presence or absence of surface treatment or adhesion treatment thereof. Therefore, the surface free energy should be specifically grasped for individual substrates which are actually used. In the present invention, the surface free energy can be measured by, for example, a method of measuring the contact angle of the substrate using pure water, and obtaining the surface free energy from the contact angle in accordance with ASTM D5946 Model Surface Energy Conversion Chart (the same as in paragraph 0017).

A method of surface treatment or adhesion treatment of a substrate usually has an action of enhancing the surface free energy when treatment such as ultraviolet ozone treatment, corona discharge treatment, or plasma discharge treatment is performed.

It is important, inter alia, from the viewpoint of formation of a good clear layer on the recording layer that the recording layer in the present invention has a surface free energy of 40 to 50 ($mJ/m^2$). When the surface free energy is low, there is a tendency that a clear ink to be formed on the recording layer is repelled, leveling property is deteriorated, and gloss is not manifested. From this viewpoint, it is desirable that the surface free energy is preferably 40.5 ($mJ/m^2$) or more, more preferably 41.0 ($mJ/m^2$) or more. On the other hand, when the surface free energy is high, there is a tendency that a dot of an ink for recording spread too broadly and refinishing becomes difficult. From this viewpoint, it is desirable that the surface free energy is preferably 46 ($mJ/m^2$) or less, more preferably 45 ($mJ/m^2$) or less.

The surface free energy of the recording layer can be controlled by appropriately selecting the kind and addition amount of a coloring agent, a polymerizable compound and a surface tension regulator contained in the energy ray-curable ink composition for ink-jet recording which is usually used for forming the recording layer. Inter alia, appropriate selection of the kind and addition amount of the surface tension regulator is effective for controlling the surface free energy of the recording layer to a predetermined value.

After a printed coating film as the recording layer formed on a substrate is cured according to a conventional method, the surface free energy of a cured product should be specifically grasped. In the present invention, the surface free energy can be measured by, for example, a method of calculating the surface free energy from a contact angle obtained by measurement using pure water in accordance with ASTM D5946 Model Surface Energy Conversion Chart.

As the coloring agent, various conventionally known dyes may be used. From the viewpoint of weather resistance, it is preferable to use either an inorganic pigment or an organic pigment, or both of them.

Examples of the inorganic pigment include titanium oxide, zinc flower, zinc oxide, tripon, iron oxide, aluminum oxide, silicon dioxide, kaolinite, montmorillonite, talc, barium sulfate, calcium carbonate, silica, alumina, cadmium red, colcothar, molybdenum red, chrome vermillion, molybdate orange, lead yellow, chrome yellow, cadmium yellow, yellow iron oxide, titanium yellow, chromium oxide, viridian, cobalt green, titanium cobalt green, cobalt chromium green, ultramarine, ultramarine blue, Prussian blue, cobalt blue, cerulean blue, manganese violet, cobalt violet, and mica.

Examples of the organic pigment include azo, azomethine, polyazo, phthalocyanine, quinacridone, anthraquinone, indigo, thioindigo, quinophthalone, benzimidazolone and isoindoline organic pigments. Alternatively, carbon black consisting of acidic, neutral or basic carbon may be used. Further, hollow particles of a crosslinked acrylic resin may be used as the organic pigment.

Examples of a pigment having a cyan color include C.I. Pigment Blue 1, C.I. Pigment Blue 2, C.I. Pigment Blue 3, C.I. Pigment Blue 15:3, C.I. Pigment Blue 15:4, C.I. Pigment Blue 16, C.I. Pigment Blue 22 and C.I. Pigment Blue 60. Among them, from the viewpoint of weather resistance and coloring power, either C.I. Pigment Blue 15:3 or C.I. Pigment Blue 15:4 or both of them is preferable.

Examples of a pigment having a magenta color include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 168, C.I. Pigment Red 184, C.I. Pigment Red 202, C.I. Pigment Red 209, C.I. Pigment Red 254 and C.I. Pigment Violet 19. Among them, from the viewpoint of weather resistance and coloring power, at least one kind selected from the group consisting of C.I. Pigment Red 122, C.I. Pigment Red 202, C.I. Pigment Red 209, C.I. Pigment Red 254 and C.I. Pigment Violet 19 is preferable.

Examples of a pigment having a yellow color include C.I. Pigment Yellow 1, C.I. Pigment Yellow 2, C.I. Pigment Yellow 3, C.I. Pigment Yellow 12, C.I. Pigment Yellow 13, C.I. Pigment Yellow 140, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 109, C.I. Pigment Yellow 110, C.I. Pigment Yellow 114, C.I. Pigment Yellow 120, C.I. Pigment Yellow 128, C.I. Pigment Yellow 129, C.I. Pigment Yellow 130, C.I. Pigment Yellow 138, C.I. Pigment Yellow 139, C.I. Pigment Yellow 147, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, C.I. Pigment Yellow 213 and C.I. Pigment Yellow 214. Among them, from the viewpoint of weather resistance, at least one kind selected from the group consisting of C.I. Pigment Yellow 74, C.I. Pigment Yellow 83, C.I. Pigment Yellow 109, C.I. Pigment Yellow 110, C.I. Pigment Yellow 120, C.I. Pigment Yellow 128, C.I. Pigment Yellow 138, C.I. Pigment Yellow 139, C.I. Pigment Yellow 150, C.I. Pigment Yellow 151, C.I. Pigment Yellow 154, C.I. Pigment Yellow 155, C.I. Pigment Yellow 213 and C.I. Pigment Yellow 214 is preferable.

Examples of a pigment having a black color include HCF, MCF, RCF, LFF, and SOF manufactured by Mitsubishi Chemical Corporation; Monarch and Regal manufactured by Cabot Corporation; Color Black, Special Black and Printex manufactured by Degussa-Huels; Tokablack manufactured by Tokai Carbon Co., Ltd.; and Raven manufactured by Columbia. Among them, at least one kind selected from the group consisting of HCF #2650, HCF #2600, HCF #2350, HCF #2300, MCF #1000, MCF #980, MCF #970, MCF #960, MCF88, LFFMA7, MA8, MA11, MA77 and MA100 manufactured by Mitsubishi Chemical Corporation, and Printex 95, Printex 85, Printex 75, Printex 55 and Printex 45 manufactured by Degussa-Huels is preferable.

The content of the coloring material in the ink composition, in the case of the inorganic pigment, is preferably 5 to 20% by mass, more preferably 7 to 18% by mass, most preferably 10 to 15% by mass based on the entire composition. In the case of the organic pigment, the content is preferably 1 to 10% by mass, more preferably 1.5 to 7% by mass, most preferably 2 to 6% by mass based on the entire composition. In the case of the carbon black pigment, the content is preferably 1 to 10% by mass, more preferably 1.5 to 7% by mass, most preferably 2 to 6% by mass based on the entire composition. When the content of the coloring material is too small, there is a tendency that coloring power of an image is reduced. On the other hand, when the content of the coloring material is too large, the viscosity of the ink composition increases and flowability is easily deteriorated.

When the pigment is used as the coloring material, in order to improve dispersibility of the pigment, a pigment derivative or a pigment dispersant may be further used. Examples of the pigment derivative include a pigment derivative having a dialkylaminoalkyl group and a pigment derivative having a dialkylaminoalkylsulfonic acid amide group. Examples of the pigment dispersant include an ionic or nonionic surfactant and an anionic, cationic or nonionic polymer compound. Among them, from the viewpoint of dispersion stability, a polymer compound containing a cationic group or an anionic group is preferable. Examples of the commercially available pigment dispersant include SOLSPERSE manufactured by Lubrizol Corporation, DISPERBYK manufactured by BYK Chemie, and EFKA manufactured by EFKA Additives. The contents of the pigment derivative and the pigment dispersant in the ink composition are preferably 0.05 to 5% by mass based on the entire composition, respectively.

As a method of preparing the ink composition, a conventionally known preparation method can be used. When a pigment is used as the coloring material, the following preparation method is preferable.

First, a mixture is prepared by premixing the coloring material, part of the polymerizable compound and, if necessary, the pigment dispersant, and this mixture is dispersed with a dispersing machine to prepare a primary dispersion. Examples of the dispersing machine include a disper; container driving medium mills such as a ball mill, a centrifugal mill and a planetary ball mill; high-speed rotation mills such as a sand mill; and medium stirring mills such as a stirring tank-type mill.

Then, to the primary dispersion are added the remainder of the polymerizable compound, a photopolymerization initiator and, if necessary, other additives, and the materials are uniformly mixed using a stirring machine. Examples of the stirring machine include a three one motor, a magnetic stirrer, a disper, and a homogenizer. Alternatively, the ink composition may be mixed using a mixing machine such as a line mixer. Further, for the purpose of more finely dividing particles in the ink composition, the ink composition may be mixed using a dispersing machine such as a bead mill or a high-pressure jet mill.

When the pigment is used as the coloring material, the dispersion average particle diameter of the pigment particles in the ink composition is preferably 20 to 200 nm, more preferably 50 to 160 nm. When the dispersion average particle diameter is too small, since particles are fine, there is a tendency that weather resistance of a printed article is reduced. On the other hand, when the dispersion average particle diameter is too large or more than 200 nm, there is a tendency that fineness of a printed article is reduced.

The ink composition for forming a clear layer of the present invention usually contains a polymerizable compound, a photopolymerization initiator and a surface tension regulator.

As the polymerizable compound, a monofunctional monomer or a polyfunctional monomer having one or more ethylenic double bonds in a molecule that has a property of being cured with an energy ray can be used.

Examples of the monofunctional monomer having one ethylenic double bond in a molecule include amyl(meth) acrylate, isoamyl (meth)acrylate, octyl(meth)acrylate, isooctyl(meth)acrylate, decyl (meth)acrylate, isodecyl(meth)acrylate, lauryl(meth)acrylate, isomyristyl (meth)acrylate, steaxyl(meth)acrylate, isostearyl(meth)acrylate, 2-ethylhexyl-diglycol (meth)acrylate, 2-(meth)acryloyloxyethylhexahydrophthalic acid, neopentyl glycol (meth)acrylic acid benzoic acid ester, butoxyethyl(meth)acrylate, ethoxy-diethylene glycol (meth)acrylate, methoxy-triethylene glycol (meth)acrylate, methoxy-polyethylene glycol (meth)acrylate, methoxydipropylene glycol (meth)acrylate, phenoxyethyl(meth)acrylate, phenoxy-polyethylene glycol (meth) acrylate, nonylphenol ethylene oxide adduct (meth)acrylate, tetrahydrofurfuryl(meth)acrylate, isobornyl (meth)acrylate, 2-hydroxyethyl(meth)acrylate, 2-hydroxypropyl (meth) acrylate, 2-hydroxybutyl(meth)acrylate, 2-hydroxy-3-phenoxypropyl (meth)acrylate, 2-(meth)acryloyloxyethyl-succinic acid, 2-(meth)acryloyloxyethyl-phthalic acid, 2-(metWacryloyloxyethyl-2-hydroxyethyl-phthalic acid, and (meth)acrylate monomers in which a functional group such as phosphorus or fluorine is added to the aforementioned monomers. These can be used alone or in combination of two or more kinds of them. It is preferable from the viewpoint of a low viscosity and low odor that, among them, isooctyl acrylate or tetrahydrofurfuryl acrylate is used.

Examples of the polyfunctional monomer having two ethylenic double bonds in a molecule include hydroxypivalic acid neopentyl glycol di(meth)acrylate, polytetramethylene glycol di(meth)acrylate, trimethylolpropane (meth)acrylic acid benzoic acid ester, diethylene glycol di(meth)acrylate, triethylene glycol di(meth)acrylate, tetraethylene glycol di(meth)acrylate, polyethylene glycol (200) di(meth)acrylate, polyethylene glycol (400) di(meth)acrylate, polyethylene glycol (600) di(meth)acrylate, polyethylene glycol (1000) di(meth)acrylate, dipropylene glycol di(meth)acrylate, tripropylene glycol di(meth)acrylate, polypropylene glycol (400) di(meth)acrylate, polypropylene glycol (700) di(meth)acrylate, neopentyl glycol di(meth)acrylate, 1,3-butanediol di(meth)acrylate, 1,4-butanediol di(meth)acrylate, 1,6-hexanediol di(meth)acrylate, 1,9-nonanediol di(meth) acrylate, neopentyl glycol di(meth)acrylate, dimethylol-tricyclodecane di(meth)acrylate, bisphenol A ethylene oxide adduct di(meth)acrylate, and bisphenol A propylene oxide adduct di(meth)acrylate. These can be used alone or in combination of two or more kinds of them. It is preferable from the viewpoint of a low viscosity and high reactivity that, among them, 1,6-hexanediol diacrylate or tripropylene glycol diacrylate is used.

Examples of the polyfunctional monomer having three ethylenic double bonds in a molecule include trimethylolpropane tri(meth)acrylate, pentaerythritol tri(meth)acrylate, tris (2-hydroxyethyl)isocyanurate tri(meth)acrylate, glyceryl tri (meth)acrylate, and these monomers modified with ethylene oxide, with propylene oxide or with caprolactone. These can be used alone or in combination of two or more kinds of them. It is preferable from the viewpoint of a low viscosity and high reactivity that, among them, trimethylolpropane triacrylate or pentaerythritol triacrylate is used.

Examples of the polyfunctional monomer having four ethylenic double bonds in a molecule include ditrimethylolpropane tetra(meth)acrylate, pentaerythritol tetra(meth)acrylate, and these monomers modified with ethylene oxide, with propylene oxide, or with caprolactone. These can be used alone or in combination of two or more kinds of them. It is preferable from the viewpoint of a low viscosity and high reactivity that, among them, ditrimethylolpropane tetraacrylate is used.

Examples of the polyfunctional monomer having five ethylenic double bonds in a molecule include dipentaerythritol hydroxy penta(meth)acrylate, and this monomer modified with ethylene oxide, with propylene oxide, or with caprolactone. These can be used alone or in combination of two or more kinds of them. It is preferable from the viewpoint of high reactivity that, among them, dipentaerythritol hydroxy pentaacrylate is used.

Examples of the polyfunctional monomer having six ethylenic double bonds in a molecule include dipentaerythritol hexa(meth)acrylate, and this monomer modified with ethylene oxide, with propylene oxide, or with caprolactone. These can be used alone or in combination of two or more kinds of them. It is preferable from the viewpoint of high reactivity that, among them, dipentaerythritol hexaacrylate is used.

In the ink composition for forming a clear layer of the present invention, it is also possible to jointly use polymerizable compounds other than the aforementioned monomers as the polymerizable compound as far as the object of the present invention is not impaired. As such other polymerizable compounds, monomers, prepolymers, oligomers and the like can be used without any particular limitation as far as they are ethylenic double bond-containing compounds.

As the polymerizable compound, oligomers or prepolymers may be further contained. Examples of such oligomers or prepolymers include Ebecryl 230, Ebecryl 244, Ebecryl 245, Ebecryl 270, Ebecryl 280/151B, Ebecryl 284, Ebecryl 285, Ebecryl 4830, Ebecryl 4835, Ebecryl 4858, Ebecryl 4883, Ebecryl 8402, Ebecryl 8803, Ebecryl 8800, Ebecryl 254, Ebecryl 264, Ebecryl 265, Ebecryl 294/35HD, Ebecryl 1259, Ebecryl 1264, Ebecryl 4866, Ebecryl 9260, Ebecryl 8210, Ebecryl 1290, Ebecryl 1290K, Ebecryl 5129, Ebecryl 2000, Ebecryl 2001, Ebecryl 2002, Ebecryl 2100, Ebecryl 7100, KRM 7222, KRM 7735, KRM 4842, KRM 210, KRM 215, KRM 4827, KRM 4849, KRM 6700, KRM 6700-20T, KRM 204, KRM 205, KRM 6602, KRM 220, KRM 4450, KRM 770, IRR 567, IPR 81, IPR 84, IPR 83, IPR 80, IPR 657, IPR 800, IPR 805, IPR 808, IPR 810, IPR 812, IPR 1657, IPR 1810, IRR 302, IPR 450, IPR 670, IPR 830, IPR 835, IPR 870, IPR 1830, IPR 1870, IPR 2870, IRR 267, IPR 813, IRR 483, IPR 811, IPR 436, IPR 438, IPR 446, IPR 505, IPR 524, IPR 525, IPR 554W, IPR 584, IPR 586, IPR 745, IPR 767, IPR 1701, IPR 1755, IPR 740/40TP, IPR 600, IPR 601, IPR 604, IPR 605, IPR 607, IPR 608, IPR 609, IPR 600/25TO, IPR 616, IPR 645, IPR 648, IPR 860, IPR 1606, IPR 1608, IPR 1629, IPR 1940, IPR 2958, IPR 2959, IPR 3200, IPR 3201, IPR 3404, IPR 3411, IPR 3412, IPR 3415, IPR 3500, IPR 3502, IPR 3600, IPR 3603, IPR 3604, IPR 3605, IPR 3608, IPR 3700, IPR 3700-20H, IPR 3700-20T, IPR 3700-25R, IPR 3701, IPR 3701-20T, IPR 3703, IPR 3702, RDX 63182, RDX 6040, and IRR 419 manufactured by Daicel UCB;

CN104, CN120, CN124, CN136, CN151, CN2270, CN2271E, CN435, CN454, CN970, CN971, CN972, CN9782, CN981, CN9893, and CN991 manufactured by Sartomer; Laromer EA81, Laromer LR8713, Laromer LR8765, Laromer LR8986, Laromer PE56F, Laromer PE44F, Laromer LR8800, Laromer PE46T, Laromer LR8907, Laromer PO43F, Laromer PO77F, Laromer PE55F, Laromer LR8967, Laromer LR8981, Laromer LR8982, Laromer LR8992, Laromer LR9004, Laromer LR8956, Laromer LR8985, Laromer LR8987, Laromer UP35D, Laromer UA19T, Laromer LR9005, Laromer PO83F, Laromer PO33F, Laromer PO84F, Laromer PO94F, Laromer LR8863, Laromer LR8869, Laromer LR8889, Laromer LR8997, Laromer LR8996, Laromer LR9013, Laromer LR9019, Laromer PO9026V, and Laromer PE9027V manufactured by BASF;

Photomer 3005, Photomer 3015, Photomer 3016, Photomer 3072, Photomer 3982, 3215, Photomer 5010, Photomer 5429, Photomer 5430, Photomer 5432, Photomer 5662, Photomer 5806, Photomer 5930, Photomer 6008, Photomer 6010, Photomer 6019, Photomer 6184, Photomer 6210, Photomer 6217, Photomer 6230, Photomer 6891, Photomer 6892, Photomer 6893-20R, Photomer 6363, Photomer 6572, and Photomer 3660 manufactured by Cognis;

Art Resin UN-9000HP, Art Resin UN-9000PEP, Art Resin UN-9200A, Art Resin UN-7600, Art Resin UN-5200, Art Resin UN-1003, Art Resin UN-1255, Art Resin UN-3320HA, Art Resin UN-33201-1B, Art Resin UN-3320HC, Art Resin UN-3320HS, Art Resin UN-901T, Art Resin UN-1200TPK, Art Resin UN-6060PTM, and Art Resin UN-6060P manufactured by Negami Chemical Industrial Co., Ltd.;

Shikoh UV-6630B, Shikoh UV-7000B, Shikoh LTV-7510B, Shikoh UV-7461TE, Shikoh UV-3000B, Shikoh UV-3200B, Shikoh UV-3210EA, Shikoh UV-3310B, Shikoh UV-3500BA, Shikoh UV-3520TL, Shikoh UV-3700B, Shikoh-UV-6100B, Shikoh UV-6640B, Shikoh LTV-1400B, Shikoh UV-1700B, Shikoh UV-6300B, Shikoh UV-7550B, Shikoh UV-7605B, Shikoh UV-7610B, Shikoh UV-7620EA, Shikoh UV-7630B, Shikoh UV-7640B, Shikoh UV-2000B, Shikoh UV-2010B, Shikoh UV-2250EA, and Shikoh UV-2750B manufactured by Nippon Synthetic Chemical Industry Co., Ltd.; and Karayad R-280, Karayad R-146, Karayad R-131, Karayad R-205, Karayad EX2320, Karayad R-190, Karayad R-130, Karayad R-300, Karayad C-0011, Karayad TCR-1234, Karayad ZFR-1122, Karayad UX-2201, Karayad UX-2301, Karayad UX-3204, Karayad UX-3301, Karayad UX-4101, Karayad UX-6101, Karayad UX-7101, Karayad MAX-5101, Karayad MAX-5100, Karayad MAX-3510, and Karayad UX-4101 manufactured by Nippon Kayaku Co., Ltd. An amount of the oligomer or the prepolymer in the ink composition is not particularly limited, but is preferably 5 to 30% by mass based on the entire composition.

The ink composition for forming a clear layer of the present invention can also contain a photopolymerization initiator and a surface tension regulator in addition to the polymerizable compound.

It is preferable to use a photopolymerization initiator containing at least one kind of compound selected from the group consisting of an acylphosphine oxide compound, an α-aminoalkylphenone compound and a thioxanthone compound, which can initiate polymerization at a low energy, as the photopolymerization initiator. It is preferable from the viewpoint of curability when, particularly, light emitting diode (LED) light is used as a light source, and transparency, and non-yellowing property at long term storage of the resulting clear ink that a photopolymerization initiator to be used contains at least an acylphosphine oxide compound.

Examples of the acylphosphine oxide compound include 2,4,6-trimethylbenzoyldiphenylphosphine oxide, 2,6-dimethoxybenzoyldiphenylphosphine oxide, 2,6-dichlorobenzoyldiphenylphosphine oxide, 2,3,5,6-tetramethylbenzoyldiphenylphosphine oxide, 2,6-dimethylbenzoyldiphenylphosphine oxide, 4-methylbenzoyldiphenylphosphine oxide, 4-ethylbenzoyldiphenylphosphine oxide, 4-isopropylbenzoyldiphenylphosphine oxide, 1-methylcyclohexanoylbenzoyldiphenylphosphine oxide, bis(2,4,6-trimethylbenzoyl)-phenylphosphine oxide, methyl 2,4,6-trimethylbenzoylphenylphosphinate, isopropyl 2,4,6-trimethylbenzoylphenylphosphinate, and bis(2,6-dimethoxybenzoyl)-2,4,4-trimethylpentylphosphine oxide. These may be used alone or in combination of two or more kinds of them. Examples of the commercially available acylphosphine oxide compound include "DAROCURE TPO" manufactured by CIBA.

Examples of the α-aminoalkylphenone compound include 2-methyl-1[4-(methylthio)phenyl]-2-morpholinopropane-1-one and 2-benzyl-2-dimethylamino-1-(4-morpholinophenyl) butanone-1,2-methyl-1-[4-(methoxythio)-phenyl]-2-morpholinopropane-2-one. These may be used alone or in combination of two or more kinds of them. Examples of the commercially available α-aminoalkylphenone compound include "IRGACURE 369" and "IRGACURE 907" manufactured by CIBA.

Examples of the thioxanthone compound include thioxanthone, 2-methylthioxanthone, 2-ethylthioxanthone, 2-isopropylthioxanthone, 4-isopropylthioxanthone, 2-chlorothioxanthone, 2,4-dimethylthioxanthone, 2,4-diethylthioxanthone, 2,4-dichlorothioxanthone and 1-chloro-4-propoxythioxanthone. These may be used alone or in combination of two or more kinds of them Examples of the commercially available thioxanthone compound include "MKAYACURE DETX-S" manufactured by Nippon Kayaku Co., Ltd., and "Chivacure ITX" manufactured by Double Bond Chemical.

It is desirable that the content of the photopolymerization initiator used in the ink composition for forming a clear layer of the present invention is preferably 5% by mass or more, more preferably 7% by mass or more based on the entire ink composition for forming a clear layer of the present invention, from the viewpoint that an ink excellent in curability and adhesiveness can be obtained even by irradiation at a low energy. On the other hand, it is desirable that the content of the photopolymerization initiator is preferably 20% by mass or less, more preferably 15% by mass or less based on the entire ink composition for forming a clear layer of the present invention from the viewpoint that unreacted components can be prevented from remaining.

Examples of the surface tension regulator include a silicone compound and a fluorine compound. Among them, the silicone compound is preferable. When the surface tension regulator such as the silicone compound is used with the polymerizable compound, liquid physical properties such as surface tension can be adjusted in a range suitable for an ink-jet system and, at the same time, an ink composition for forming a clear layer excellent in leveling property on an image can be obtained. In addition, among silicone compounds, a silicone compound having an ethylenic double bond in a molecule is preferable. By using the polymerizable compound and the silicone compound having an ethylenic double bond in a molecule, adhesiveness with an image can be further improved.

Examples of the silicone compound include BYK-300, BYK-302, BYK-306, BYK-307, BYK-310, BYK-315, BYK-320, BYK-322, BYK-323, BYK-325, BYK-330, BYK-331, BYK-333, BYK-337, BYK-344, BYK-370, BYK-375, BYK-377, BYK-UV3500, BYK-UV3510, and BYK-UV3570 manufactured by BYK Chemie; TEGO-Rad2100, TEGO-Rad2200N, TEGO-Rad2250, TEGO-Rad2300, TEGO-Rad2500, TEGO-Rad2600, and TEGO-Rad2700 manufactured by Degussa; and Glanol 100, Glanol 115, Glanol 400, Glanol 410, Glanol 435, Glanol 440, Glanol 450, B-1484, Polyflow-ATF-2, KL-600, UCR-L72, and UCR-L93 manufactured by Kyoeisha Chemical Co., Ltd. These may be used alone or in combination of two or more kinds of them.

The content of the surface tension regulator used in the ink composition for forming a clear layer of the present invention is not particularly limited, but is preferably 2% by mass or less, more preferably 0.01 to 2% by mass based on the entire ink composition. When the content of the surface tension regulator is large, an undissolved matter may be generated or foaming may be caused.

For the purpose of further improving light resistance of a clear layer, it is preferable that the ink composition for forming a clear layer of the present invention further contains an ultraviolet absorber and an antioxidant. As the ultraviolet absorber, for example, a triazine ultraviolet absorber, a benzotriazole ultraviolet absorber, and an oxalylanilide ultraviolet absorber can be used.

Examples of the triazine ultraviolet absorber include 2,4-bis(2-hydxoxy-4-butyloxyphenyl)-6-(2,4-bis-butyloxyphenyl)-1,3,5-triazine, 2-[4-[(2-hydroxy-3-(2'-ethyl)hexyl)oxy]-2-hydroxyphenyl]-4,6-bis(2,4-dimethyl-phenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, and 2-[4-[(2-hydroxy-3-tridecyloxypropyl)oxy]-2-hydroxyphenyl]-4,6-bis(2,4-dimethylphenyl)-1,3,5-triazine. Examples of the commercially available triazine ultraviolet absorber include "TINUVIN 460", "TINUVIN 405", and "TINUVIN 400" manufactured by CIBA.

Examples of the benzotriazole ultraviolet absorber include 2-(2H-benzotriazol-2-yl)-4,6-bis(1-methyl-1-phenylethyl)phenol and 2-(2H-benzotriazol-2-yl)-6-(1-methyl-1-phenylethyl)-4-(1,1,3,3-tetramethylbutyl)phenol. Examples of the commercially available benzotriazole ultraviolet absorber include "TINUVIN 900" and "TINIVIN 928" manufactured by CIBA.

Examples of the oxalylanilide ultraviolet absorber include ethanediamide-N-(2-ethoxyphenyl)-N'-(2-ethoxyphenyl)-(oxalylamide) and ethanediamido-N-(2-ethoxyphenyl)-N'-(4-isodecylphenyl)-(oxalylamide). Examples of the commercially available oxalylanilide ultraviolet absorber include "Sanduvor VSU Powder" and "Sanduvor 3206 Liq." manufactured by Clariant.

Examples of other ultraviolet absorbers include propanedioic acid [(4-methoxyphenyl)-methylene]-dimethyl ether ["Sanduvor PR-25 Gran" (trade name) manufactured by Clariant].

Examples of the antioxidant include a phosphorus oxide antioxidant, a phenol antioxidant, and a thioether antioxidant.

Examples of the phosphorus oxide antioxidant include tetrakis(2,4-di-tert-butylphenyl)4,4'-biphenylene-di-phosphonate. Examples of the commercially available phosphorus oxide antioxidant include "Sandostab P-EPQ Powder" manufactured by Clariant and, further, PEP-4C, PEP-8, PEP-8W, PEP-24G, PEP-36, PEP-36Z, HP-10, 2112RG, 260, 522A, 1178, 1500, C, 135A, 3010, and TPP manufactured by ADEKA.

Examples of the phenol antioxidant include AO-20, AO-30, AO-40, AO-50, AO-60, AO-70, AO-80, and AO-330 manufactured by ADEKA.

Examples of the thioether antioxidant include AO-4128 and AO-503 manufactured by ADEKA.

The contents of the ultraviolet absorber and the antioxidant used in the ink composition for forming a clear layer of the present invention are not particularly limited, but may be 0.05 to 10.0% by mass based on the entire ink composition, respectively.

In addition, the ink composition for forming a clear layer of the present invention may further contain general additives such as a leveling agent, an antifoaming agent, a pH adjuster, a charge imparting agent, a germicide, an antiseptic, a deodorant, a charge adjusting agent, a wetting agent, an antiskinning agent, and a perfume as optional components, if necessary.

The ink composition for forming a clear layer of the present invention can be prepared using a conventional method. For example, by uniformly mixing the polymerizable compound, the photopolymerization initiator and the surface tension regulator and, if necessary, other additives using a stirring machine, the ink composition for forming a clear layer can be prepared. Examples of the stirring machine to be used include a three one motor, a magnetic stirrer, a disper, and a homogenizer.

The ink composition for forming a clear layer of the present invention is an ink composition that does not substantially contain a diluting solvent and preferably has a viscosity of 4 to 50 mPa·s at 25° C. from the viewpoint of enhancement of continuous discharging property of an ink. In order to adjust the viscosity to such a value, the ink composition for forming a clear layer of the present invention may contain an alcohol, ester, ketone, glycol, or hydrocarbon diluting solvent in an amount of 0 to 5% by mass based on the entire ink composition. In addition, it is preferable that the ink composition for forming a clear layer of the present invention has a surface tension of 23 to 34 mN/m at 25° C. from the viewpoint that it has liquid physical properties suitable for an ink-jet system and manifests good leveling property on an image.

The inkjet system which can be applied to the ink composition for forming a clear layer of the present invention is not particularly limited, and examples thereof include a charge control system of discharging an ink utilizing an electrostatic attraction force, a drop on demand system (pressure pulse system) utilizing a vibration pressure of a piezoelectric element, an acoustic ink-jet system utilizing the radiation pressure which converts an electric signal into an acoustic beam to irradiate an ink with the beam, and a thermal ink jet system of heating an ink to form air bubbles and utilizing the generated pressure.

As an active energy ray radiated in order to polymerize and cure an ink composition applied to a substrate to form a clear layer, an ultraviolet LED and an ultraviolet laser can be used in addition to a mercury lamp and a metal halide lamp.

The present invention also relates to a printed article having a clear layer formed using the aforementioned ink composition for forming a clear layer of the present invention.

That is, when a printed article is formed, first, an ink composition for forming an image containing a coloring agent such as an energy ray-curable ink composition for ink-jet recording is discharged usually with an ink-jet recording apparatus, to form an image coating film on which a character, a mark, a pattern or a figure is formed in a predetermined pattern, and this image coating film is irradiated with an active energy ray such as an ultraviolet ray to cure. Then, an ink composition for forming a clear layer not containing a coloring material is discharged onto the image usually with an ink-jet recording apparatus to form a clear layer coating film, and this clear layer coating film is irradiated with an active energy ray to cure.

Since the ink composition for forming a clear layer of the present invention is excellent in adhesiveness with any of a substrate, a recording layer and a clear layer, and is also excellent in overcoating property and refinishing properties, it is of course suitable for the conventional overcoating printing in which the whole of the recording medium surface or an image formed on a recording medium is solid-covered, and is also suitable for a case where a step of laminating a clear ink is repeated to form a thick clear layer having a layer thickness being severalfold or more than that of the conventional layer, preferably 5 μm to 1 mm or more, more preferably 100 to 300 μm. That is, the ink composition for forming a clear layer of the present invention is also suitable for the case where excellent design characteristics are imparted to a printed article by raising the whole image or a specified position on an image to generate three-dimensionality or by forming a pattern.

The present invention also relates to a method of double coating with an ink composition for forming a clear layer of the present invention. That is, the present invention relates to a method of applying an ink composition for forming a clear layer, including forming at least one clear layer on a substrate or on a printed article obtained by forming a printed coating film as a recording layer on a substrate, using an ink composition for forming a clear layer, wherein the surface free energy of the substrate is 30 to 45 (mJ/m$^2$), the surface free energy of the recording layer is 40 to 50 (mJ/m$^2$), the contact angle of the ink composition for forming a clear layer to the substrate is 30 to 65 degrees, the contact angle of the ink composition for forming a clear layer to the recording layer is 40 to 55 degrees, and the contact angle of the ink composition for forming a clear layer to the clear layer is 45 to 60 degrees. The number of clear layers to be formed can be appropriately determined according to the design characteristics to be imparted to a printed article, specifically, desired three-dimensionality or pattern to be formed by double coating of the clear layer.

As a coloring material used in the ink composition for forming an image, various conventional dyes may be used. From the viewpoint of weather resistance, it is preferable to use either an inorganic pigment or an organic pigment, or both of them. The content of the coloring material in the ink composition for forming an image is preferably 1 to 10% by mass, more preferably 2 to 7% by mass, most preferably 3 to 6% by mass based on the entire ink composition. When the content of the coloring material is too small, there is a tendency that coloring power of an image is reduced. On the other hand, when the content of the coloring material is too large, the viscosity increases and flowability is easily deteriorated. When a pigment is used as the coloring material, a pigment derivative or a pigment dispersant may be used in order to improve dispersibility of the pigment.

As a polymerizable compound used in the ink composition for forming an image, a polymerizable compound which initiates radical polymerization or cation polymerization with an active energy ray to be cured can be used without particular limitation. Among them, a polymerizable compound cured by radical polymerization is preferable, and it is more preferable to use the same compound as that used in the ink composition for forming a clear layer of the present invention. It is preferable that the content of the polymerizable compound used in the ink composition for forming an image is 10 to 90% by mass based on the entire ink composition.

As a photopolymerization initiator used in the ink composition for forming an image, the same photopolymerization initiator as that used in the ink composition for forming a clear layer of the prevent invention can be used. It is preferable that the content of the photopolymerization initiator used in the ink composition for forming an image is 5 to 15% by mass in total based on the entire ink composition.

Similarly, it is preferable that the ink composition for forming an image contains a surface tension regulator, and the same surface tension regulator as that used in the ink composition for forming a clear layer of the present invention can be used. The content of the surface tension regulator used in the ink composition for forming an image is preferably 2.5% by mass or less, more preferably 0.005 to 2.5% by mass based on the entire ink composition.

EXAMPLES

The present invention will be explained more specifically based on examples, but the present invention is not limited to these examples. Hereinafter, the description "part(s)" means "part(s) by mass". In addition, an average particle diameter in examples and comparative examples means a number average particle diameter.

Substrates used in examples and comparative examples and measured values of surface free energy thereof were as follows.

| Substrate | Contact angle was measured with pure water (degree) | Surface free energy (mJ/m$^2$) |
|---|---|---|
| Untreated PP | 97.5 | 29.5 |
| Ozone-treated PP | 87.5 | 33.5 |
| PET | 78.4 | 37.0 |
| PVC | 66.8 | 41.0 |
| ABS | 51.5 | 46.0 |

(Note)
Untreated PP: trade name Polysheet, manufactured by Shin-Kobe Electric Machinery Co., Ltd.
Ozone-treated PP: trade name Torayfan S648, manufactured by Toray Industries, Inc.
PET: trade name HK-42WF, manufactured by Higashiyama Film Co., Ltd.
PVC: trade name Controltac, manufactured by 3M
ABS: trade name Toughace T EAT100C, manufactured by Sumitomo Bakelite Co., Ltd.

Respective components used for preparing the ink for forming a clear layer and the ink for forming an image are shown in the following Table 1.

TABLE 1

| Component | Kind | Trade name · specification |
|---|---|---|
| Coloring material | Acidic carbon black pigment (MA-8) | MA-8, manufactured by Mitsubishi Chemical Corporation |
| | Nickel azo pigment (LA2) | LA-2, manufactured by CIBA |
| | Quinacridone pigment (RT343D) | CINQUASIA Magenda RT-343-D, manufactured by CIBA |
| | Copper phthalocyanine pigment (P-BFS) | HOSTAPERM BLUE P-BFS, manufactured by Clariant |
| | Titanium oxide (JR806) | JR806 (rutile-type, alumina-silica surface-modified), manufactured by TAYCA |
| Pigment dispersant | Comb-type copolymer having basic functional group (Solsperse 32000) | Solsperse 32000, manufactured by Avecia |
| (Meth)acrylate monomers | Tetrahydrofurfuryl acrylate (THF-A) | Sartomer SR285 (ethylenic double bond/one molecule: number is 1), manufactured by Sartomer |
| | Isooctyl acrylate (IO-A) | Sartomer SR440 (ethylenic double bond/one molecule: number is 1), manufactured by Sartomer |
| | Hexanediol diacrylate (HDDA) | Sartomer SR238F (ethylenic double bond/one molecule: number is 2), manufactured by Sartomer |

TABLE 1-continued

| Component | Kind | Trade name · specification |
|---|---|---|
| | Tripropylene glycol diacrylate (TPGDA) | Sartomer SR306H (ethylenic double bond/one molecule: number is 2), manufactured by Sartomer |
| | Pentaerythritol triacrylate (PE-3A) | Light Acrylate PE-3A (ethylenic double bond/one molecule: number is 3), manufactured Kyoeisha Chemical Co., Ltd. |
| (Meth)acrylate oligomers | Amine-modified oligomer (EBECRYL 7100) | EBECRYL 7100 (ethylenic double bond/one molecule average: number is 2), manufactured by DAICEL-CYTEC Company, LTD. |
| Photopolymerization initiator | 2,4,6-Trimethylbenzoyl-diphenyl-phosphine oxide (DAROCURE TPO) | DAROCURE TPO (acylphosphinoxides), manufactured by CIBA |
| | 2-Methyl-1-[4-(methylthio)phenyl]-2-morpholinopropane-1-one (IRGACURE 907) | IRGACURE 907 (α-aminoalkylphenones), manufactured by CIBA |
| | Isopropylthioxanthone (Chivacure ITX) | Chivacure ITX (thioxanthones), manufactured by Double Bond Chemical |
| Surface tension regulator | Silicone acrylate having polydimethylsiloxane structure (BYK-UV3500) | BYK-UV3500, manufactured by BYK Chemie |

<Preparation of Ink for Forming Image>

Pigments shown in Table 2 and Table 3 (20 parts), a pigment dispersant (16 parts) and IO-A (68 parts) were weighed into a plastic bottle. In the case of P-11, a pigment (40 parts), a pigment dispersant (8 parts) and IO-A (52 parts) were weighed.

To this were added 100 parts of zirconia beads, and this mixture was subjected to dispersing treatment with a paint conditioner (manufactured by Toyo Seiki Co., Ltd.) for 1 hour to obtain a primary dispersion. Then, to the resulting primary dispersion were added remaining components in the incorporation amounts shown in Table 2 and Table 3, and the mixture was stirred with a magnetic stirrer for 30 minutes. After stirring, this mixture was suction-filtered using a glass filter (manufactured by Kiriyama Glass Co.) to prepare each of inks P-1 to P-11 for forming an image.

TABLE 2

| Ink composition for forming image layer | | | P-1 | P-2 | P-3 | P-4 | P-5 |
|---|---|---|---|---|---|---|---|
| Coloring material | MA-8 | (Part) | 2 | 2 | 2 | 2 | 2 |
| | LA-2 | (Part) | — | — | — | — | — |
| | RT343D | (Part) | — | — | — | — | — |
| | P-BFS | (Part) | — | — | — | — | — |
| | JE-806 | (Part) | — | — | — | — | — |
| Pigment dispersant | | (Part) | 1.6 | 1.6 | 1.6 | 1.6 | 1.6 |
| (Meth)acrylate monomers | THF-A | (Part) | 15 | 15 | 15 | 15 | 15 |
| | IO-A | (Part) | 15.01 | 15.01 | 15 | 15 | 14.98 |
| | HDDA | (Part) | 15 | 15 | 15 | 15 | 15 |
| | TPGDA | (Part) | 20 | 20 | 20 | 20 | 20 |
| | PB-3A | (Part) | 20 | 20 | 20 | 20 | 20 |
| Photopolymerization initiator | IRGACURE 907 | (Part) | 8.99 | 8.99 | 8.99 | 8.99 | 8.99 |
| | CHIVACURE ITX | (Part) | 2.4 | 2.4 | 2.4 | 2.4 | 2.4 |
| Surface tension regulator | BYK-UV3500 | (Part) | None | 0.001 | 0.005 | 0.01 | 0.03 |
| Total | | (Part) | 100 | 100 | 100 | 100 | 100 |
| Cured product | Surface tension | mN/m² | 37.1 | 33.4 | 29.7 | 28.6 | 24.2 |
| | Contact angle with pure water | Degree | 53.4 | 55.7 | 60.2 | 62.5 | 64.2 |
| | Surface free energy | mJ/m² | 45.5 | 45.0 | 43.0 | 42.5 | 42.0 |

TABLE 3

| Ink composition for forming image layer | | | P-6 | P-7 | P-8 | P-9 | P-10 | P-11 |
|---|---|---|---|---|---|---|---|---|
| Coloring material | MA-8 | (Part) | 2 | 2 | — | — | — | — |
| | LA-2 | (Part) | — | — | 2 | — | — | — |
| | RT343D | (Part) | — | — | — | 4 | — | — |
| | P-BFS | (Part) | — | — | — | — | 2 | — |
| | JR-806 | (Part) | — | — | — | — | — | 10 |
| Pigment dispersant | | (Part) | 1.6 | 1.6 | 1.6 | 3.2 | 1.6 | 2.0 |

TABLE 3-continued

| Ink composition for forming image layer | | | P-6 | P-7 | P-8 | P-9 | P-10 | P-11 |
|---|---|---|---|---|---|---|---|---|
| (Meth)acrylate monomers | THF-A | (Part) | 15 | 15 | 15 | 14.4 | 15 | 10 |
| | IO-A | (Part) | 14.96 | 14.91 | 15 | 12 | 15 | 13 |
| | HDDA | (Part) | 15 | 15 | 15 | 15 | 15 | 15 |
| | TPGDA | (Part) | 20 | 20 | 20 | 20 | 20 | 20 |
| | PE-3A | (Part) | 20 | 20 | 20 | 20 | 20 | 20 |
| Photopolymerization initiator | IRGACURE 907 | (Part) | 8.99 | 8.99 | 8.99 | 8.99 | 8.99 | — |
| | CHIVACURE ITX | (Part) | 2.4 | 2.4 | 2.4 | 2.4 | 2.4 | — |
| | DAROCURE TPO | (Part) | — | — | — | — | — | 9.99 |
| Surface tension regulator | BYK-UV3500 | (Part) | 0.05 | 0.1 | 0.01 | 0.01 | 0.01 | 0.01 |
| Total | | (Part) | 100 | 100 | 100 | 100 | 100 | 100 |
| Cured product | Surface tension | mN/m$^2$ | 22.8 | 22.1 | 28.7 | 29.2 | 28.4 | 27.5 |
| | Contact angle with pure water | Degree | 68.7 | 72.1 | 62.0 | 62.8 | 63.0 | 62.0 |
| | Surface free energy | mJ/m$^2$ | 40.5 | 39.0 | 43.0 | 42.5 | 42.0 | 43.0 |

<Preparation of Ink for Forming Clear Layer>

Respective components were weighed in the incorporation amounts shown in Table 4, and this mixture was stirred with a magnetic stirrer for 30 minutes. After stirring, this mixture was suction-filtered using a glass filter (manufactured by Kiriyama Glass Co.), to prepare each of inks for forming a clear layer.

1. Measurement of Contact Angle of Cured Ink with Pure Water

Each ink-solid-printed article was made on a substrate, or on each printing medium made of a polyester fiber substrate, "Tetoron" 292W manufactured by Teijin Limited using a #5 bar coater, to form each printed film having a printed film thickness of 10 μm.

TABLE 4

| Ink composition for forming clear layer | | | Example 1 (Comparative) | Example 2 (Comparative) | Example 3 | Example 4 | Example 5 | Example 6 | Example 7 (Comparative) |
|---|---|---|---|---|---|---|---|---|---|
| (Meth)acrylate monomers | THFA | (Part) | 20 | 20 | 20 | 20 | 20 | 20 | 20 |
| | IOA | (Part) | 5 | 4.999 | 4.995 | 4.99 | 4.97 | 4.95 | 4.9 |
| | HDDA | (Part) | 25 | 25 | 25 | 25 | 25 | 25 | 25 |
| | TPGDA | (Part) | 10 | 10 | 10 | 10 | 10 | 10 | 10 |
| | PE-3A | (Part) | 20 | 20 | 20 | 20 | 20 | 20 | 20 |
| (Meth)acrylate oligomer | EBACRYL 7100 | (Part) | 10 | 10 | 10 | 10 | 10 | 10 | 10 |
| Photopolymerization initiator | DAROCURE TPO | (Part) | 10 | 10 | 10 | 10 | 10 | 10 | 10 |
| Surface tension regulator | BYK-UV3500 | (Part) | None | 0.001 | 0.005 | 0.01 | 0.03 | 0.05 | 0.10 |
| Total | | (Part) | 100 | 100 | 100 | 100 | 100 | 100 | 100 |
| Cured product | Surface tension | mN/m$^2$ | 37.0 | 33.1 | 30.0 | 27.6 | 25.0 | 23.5 | 22.6 |
| | Contact angle with pure water | Degree | 53.5 | 59.7 | 60.3 | 62.5 | 64.7 | 66.2 | 71.6 |
| | Surface free energy | mJ/m$^2$ | 45.6 | 43.6 | 43.0 | 42.5 | 42.0 | 41.0 | 39.5 |

The contact angle was measured according to the following method. In addition, the surface free energy of the cured product of the ink composition for forming an image layer (recording layer) and the cured product of the ink composition for forming a clear layer (clear layer) was obtained according to the following method, and the results thereof are shown in Tables 2 to 4.

[Measurement of Contact Angle]

A liquid was added dropwise onto a surface of each subject in a liquid amount of 4.0 μl in a free dropping mode, and the contact angle after 0.3 second from dropwise addition was measured using DAT1100 Fibro System AB manufactured by Matsubo Corporation.

[Measurement of Surface Free Energy of Substrate and Recording Layer]

The surface free energy of the substrate and the recording layer was obtained according to the following procedure.

This printed film was irradiated with an ultraviolet ray at a total irradiance level of 700 mJ/cm$^2$ using an ultraviolet LED ("NLBU21W01-E2") manufactured by Nichia Corporation) as an irradiation means to cure to obtain a cured product of a solid-printed article.

2. Measurement of Contact Angle with Pure Water

In accordance with the aforementioned method of measuring the contact angle, pure water was added dropwise onto the substrate or the cured ink, and the contact angle was measured.

3. Surface Free Energy

For each measured value of the contact angle obtained according to the above description, the surface free energy of the substrate and the cured ink was obtained according to the following table (ASTM D5946 Model Surface Energy Conversion Chart).

TABLE 5

ASTM D5946 Model Surface Energy Conversion Chart

| Contact angle | Surface free energy (mJ/m$^2$) |
|---|---|
| 51-53 | 46 |
| 54-56 | 45 |
| 57-59 | 44 |
| 60-62 | 43 |
| 63-65 | 42 |
| 66-68 | 41 |
| 69-71 | 40 |
| 72-73 | 39 |
| 74-76 | 38 |
| 77-79 | 37 |
| 80-81 | 36 |
| 82-84 | 35 |
| 85-87 | 34 |
| 88-89 | 33 |
| 90-92 | 32 |
| 93-95 | 31 |
| 96-97 | 30 |
| 98-100 | 29 |

The inks for forming a clear layer of Examples 1 to 7 (Examples 1, 2 and 7 are comparative examples) immediately after preparation, which were obtained as described above, were evaluated as described below. The results thereof are shown in Tables 6 to 14.

[Measurement of Contact Angle to Each Subject Concerning Ink Composition for Forming Clear Layer]

Each ink-solid-printed article was made on each printing medium made of a polyester fiber substrate, "Tetoron" 292W manufactured by Teijin Limited using a #5 bar coater to form each of printed films having a printed film thickness of 10 μm.

This printed film was irradiated with an ultraviolet ray at a total irradiance level of 700 mJ/cm$^2$ using an ultraviolet LED ("NLBU21W01-E2" manufactured by Nichia Corporation) as an irradiation means to cure to obtain a cured product of a solid-printed material (i.e. a cured product of an ink composition for forming an image layer (recording layer) and a cured product of an ink composition for forming a clear layer (clear layer)).

Concerning this cured product, an ink composition for forming a clear layer was added dropwise onto a substrate, a recording layer and a clear layer and the contact angle of each case was measured in accordance with the aforementioned method of measuring the contact angle.

[Viscosity]

The viscosity of the ink composition was measured using an R100-type viscometer (manufactured by Toki Sangyo Co., Ltd.) under the condition of 25° C. and a cone rotation number of 20 rpm.

[Dispersion Average Particle Diameter]

The dispersion average particle diameter of pigment particles was measured using a particle size distribution measuring apparatus FPER-1000 (manufactured by Otsuka Electronics Co., Ltd.).

[Surface Tension]

The surface tension of the ink composition was measured at 25° C. using a fully automatic balancing type electro surface tensiometer ESB-V (manufactured by Kyowa Kagaku).

[Printability Test by Solid Printing of Ink Composition for Forming Clear Layer (On Each Substrate)]

Each solid printed film of an ink composition for forming a clear layer of a printed film thickness of 10 μm and a size of 50 mm×50 mm was formed on each of the substrates (each printing medium) using an ink-jet recording apparatus equipped with a piezo-type ink-jet nozzle. The state of the ink applied to the substrate was observed 30 seconds after formation of a printed film and wettability of the ink was evaluated according to the following determination criteria. The results are shown in Table 7.

Ink was not discharged from printer head: +
Repellency was generated and uniform film was not formed: xx
State where part of film had repellency and hole was partially formed: x
Uniform film was formed: ○

Herein, an ink-jet recording apparatus equipped with a piezo-type ink-jet nozzle used in this evaluation is provided with an ink tank, a supply pipe, a front chamber ink tank immediately before a head, and a piezo head as an ink supply system. In addition, the ink jet recording apparatus was driven at a driving frequency of 10 KHz, so that the ink could be injected at a liquid droplet size of about 7 pl and a resolution of 600×600 dpi.

[Printability Test by Thick Printing of Ink Composition for Forming Clear Layer (On Each Substrate)]

Each thin line printed article of an ink composition for forming a clear layer of a printed film thickness of 10 μm, a width of 2 mm and a length of 50 mm was formed on each of the substrates (printing medium) using an inkjet recording apparatus equipped with a piezo-type inkjet nozzle. The state of the ink applied to the substrate was observed 30 seconds after formation of the thin line printed article and wettability of the ink was evaluated according to the following determination criteria. The results are shown in Table 8.

Ink was not discharged from printer head: +
Ink wetted too much and width of thin line spread to 3 mm or more: x
Width of thin line is maintained in the range of 2 mm±0.4 mm: ○
Repellency was generated and part where width of thin line was smaller than 1.5 mm was generated: xx

[Printability Test by Solid Printing of Ink Composition for Forming Clear Layer (On Image Recording Layer)]

Each solid printed film of an ink composition for forming an image of a printed film thickness of 10 μm and a size of 50 mm×50 mm was formed on each printing medium made of a polyester fiber substrate, "Tetoron" 292W manufactured by Teijin Limited using an ink-jet recording apparatus equipped with a piezo-type inkjet nozzle.

This printed film was irradiated with an ultraviolet ray at a total irradiance level of 700 mJ/cm$^2$ using an ultraviolet LED ("NLBU21W01-E2" manufactured by Nichia Corporation" as an irradiation means to cure to obtain a solid-printed article of an ink composition for forming an image.

On this solid-printed article of an ink composition for forming an image, each solid printed film of an ink composition for forming a clear layer of a printed film thickness of 10 μm and a size of 50 mm×50 mm was formed. The state of the ink applied to the substrate was observed 30 seconds after formation of the printed film and wettability of the ink composition for forming a clear layer on the solid-printed article of the ink composition for forming an image was evaluated according to the following determination criteria. The results are shown in Table 10.

Ink was not discharged from printer head: +
Repellency was generated and uniform film was not formed: xx
State where part of film had repellency and hole was partially formed: x
Uniform film was formed: ○

[Printability Test by Thick Printing of Ink Composition for Forming Clear Layer (On Image Recording Layer)]

Each thin line printed article of an ink composition for forming an image of a printed film thickness of 10 µm, a width of 2 mm and a length of 50 mm was formed on each printing medium made of a polyester fiber substrate, "Tetoron" 292W manufactured by Teijin Limited using an ink-jet recording apparatus equipped with a piezo-type ink-jet nozzle.

This printed film was irradiated with an ultraviolet ray at a total irradiance level of 700 mJ/cm$^2$ using an ultraviolet LED ("NLBU21W01-E2" manufactured by Nichia Corporation) as an irradiation means to cure to obtain a thin line printed article of an ink composition for forming an image.

On this thin line printed article of an ink composition for forming an image, each thin line printed article of an ink composition for forming a clear layer of a printed film thickness of 10 µm, a width of 2 mm and a length of 50 mm was formed. The state of the ink composition for forming a clear layer applied to the thin line printed article of the ink composition for forming an image was observed 30 seconds after formation of the printed film and wettability of the ink composition for forming a clear layer on a solid-printed article of the ink composition for forming an image was evaluated according to the following determination criteria. The results are shown in Table 11.

Ink was not discharged from printer head: +

Ink wetted too much and state where ink composition for forming clear layer had fallen from thin line printed article of ink composition for forming image was generated: ×

Ink composition for forming clear layer was printed on thin line printed article of ink composition for forming image without causing falling or generating repellency: ○

Ink composition for forming clear layer generated repellency on thin line printed article of ink composition for forming image, resulting in uneven printing: ××

[Printability Test by Solid Printing of Ink Composition for Forming Clear Layer (On Cured Clear Ink Layer)]

Each solid printed film of an ink for forming a clear layer of a printed film thickness of 10 µm and a size of 50 mm×50 mm was formed on each printing medium made of a polyester fiber substrate, "Tetoron" 292W manufactured by Teijin Limited using an ink-jet recording apparatus equipped with a piezo-type ink-jet nozzle.

This printed film was irradiated with an ultraviolet ray at a total irradiance level of 700 mJ/cm$^2$ using an ultraviolet LED ("NLBU21W01-E2" manufactured by Nichia Corporation) as an irradiation means to cure to obtain a solid-printed article of an ink composition for forming a clear layer.

On this solid-printed article of an ink for forming a clear layer, each solid printed film of an ink composition for forming a clear layer of a printed film thickness of 10 µm and a size of 50 mm×50 mm was formed. The state of the ink applied to the substrate was observed 30 seconds after formation of the printed film and wettability of the ink composition for forming a clear layer on the solid-printed article of the ink composition for forming a clear layer was evaluated according to the following determination criteria. The results are shown in Table 13.

Ink was not discharged from printer head: +

Repellency was generated and uniform film was not formed: ××

State where part of film had repellency and hole was partially formed: ×

Uniform film was formed: ○

[Printability Test by Thick Printing of Ink Composition for Forming Clear Layer (On Cured Clear Ink Layer)]

Each thin line printed article of an ink composition for forming a clear layer of a printed film thickness of 10 µm, a width of 2 mm and a length of 50 mm was formed on each printing medium made of a polyester fiber substrate, "Tetoron" 292W manufactured by Teijin Limited using an ink-jet recording apparatus equipped with a piezo-type ink-jet nozzle.

This printed film was irradiated with an ultraviolet ray at a total irradiance level of 700 mJ/cm$^2$ using an ultraviolet LED ("NLBU21W01-E2" manufactured by Nichia Corporation) as an irradiation means to cure to obtain a thin line printed article of an ink composition for forming a clear layer.

On this thin line printed article of an ink composition for forming a clear layer, each thin line printed article of an ink composition for forming a clear layer of a printed film thickness of 10 µm, a width of 2 mm and a length of 50 mm was formed. The state of the ink composition for forming a clear layer applied to the thin line printed article of the ink composition for forming a clear layer was observed 30 seconds after formation of the printed film and wettability of the ink composition for forming a clear layer on a solid-printed article of the ink composition for forming a clear layer was evaluated according to the following determination criteria. The results are shown in Table 14.

Ink was not discharged from printer head: +

Ink wetted too much and state where ink composition for forming clear layer had fallen from thin line printed article of ink composition for forming clear layer was generated: ×

Ink composition for forming clear layer was printed on thin line printed article of ink for forming clear layer without causing falling or generating repellency: ○

Ink composition for forming clear layer generated repellency on thin line printed article of ink for forming clear layer, resulting in uneven printing: ××

In addition, since the P-1 ink and the ink of Example 1 were not discharged from a printer head, no printing sample for evaluation was made. Therefore, a printability test by solid printing and a printability test by thick printing were not performed. (In the tables, this case is indicated with diagonal lines (/).)

TABLE 6

| | Contact angle of ink composition for forming clear layer to each substrate (degree) | | | | | | |
|---|---|---|---|---|---|---|---|
| | Example 1 | Example 2 | Example 3 | Example 4 | Example 5 | Example 6 | Example 7 |
| Untreated PP | 97.8 | 90.8 | 80.9 | 72.4 | 66.5 | 62.3 | 60.5 |
| Ozone-treated PP | 74.2 | 66.4 | 62.1 | 59.4 | 52.7 | 48.4 | 45.1 |
| PET | 69.5 | 61.2 | 59.6 | 55.2 | 50.9 | 45.8 | 43.2 |
| PVC | 60.2 | 58.7 | 54.2 | 51.1 | 46.2 | 42.1 | 39.5 |
| ABS | 60.5 | 54.1 | 50.2 | 45.2 | 38.5 | 30.3 | 28.4 |

TABLE 7

Printability of ink composition for forming clear layer by solid printing (on substrate)

|  | Example 1 | Example 2 | Example 3 | Example 4 | Example 5 | Example 6 | Example 7 |
|---|---|---|---|---|---|---|---|
| Untreated PP | xx | xx | xx | xx | x | ○ | ○ |
| Ozone-treated PP | xx | xx | ○ | ○ | ○ | ○ | ○ |
| PET | ○ | ○ | ○ | ○ | ○ | ○ | ○ |
| PVC | ○ | ○ | ○ | ○ | ○ | ○ | ○ |
| ABS | ○ | ○ | ○ | ○ | ○ | ○ | ○ |

TABLE 8

Thick printability of ink composition for forming clear layer (on substrate)

|  | Example 1 | Example 2 | Example 3 | Example 4 | Example 5 | Example 6 | Example 7 |
|---|---|---|---|---|---|---|---|
| Untreated PP | — | xx | xx | xx | xx | xx | ○ |
| Ozone-treated PP | — | xx | ○ | ○ | ○ | ○ | ○ |
| PET | — | ○ | ○ | ○ | ○ | ○ | ○ |
| PVC | — | ○ | ○ | ○ | ○ | ○ | x |
| ABS | — | ○ | ○ | ○ | ○ | x | x |

TABLE 9

Contact angle of ink composition for forming clear layer to recording layer (degree)

|  | Example 1 | Example 2 | Example 3 | Example 4 | Example 5 | Example 6 | Example 7 |
|---|---|---|---|---|---|---|---|
| P-1 | 64.3 | 52.7 | 48.2 | 44.5 | 42.5 | 39.0 | 36.8 |
| P-2 | 65.0 | 53.0 | 50.3 | 47.9 | 43.7 | 40.2 | 36.8 |
| P-3 | 64.8 | 53.6 | 52.8 | 50.3 | 45.1 | 41.8 | 37.0 |
| P-4 | 65.2 | 57.4 | 54.1 | 52.1 | 47.9 | 42.8 | 37.6 |
| P-5 | 68.1 | 62.1 | 55.7 | 54.2 | 50.4 | 46.7 | 41.2 |
| P-6 | 74.2 | 70.5 | 65.5 | 61.8 | 54.8 | 51.2 | 46.1 |
| P-7 | 78.4 | 75.3 | 71.2 | 68.7 | 64.2 | 60.8 | 54.2 |
| P-8 | 65.0 | 57.4 | 54.1 | 52.3 | 48.0 | 42.5 | 37.8 |
| P-9 | 65.1 | 57.1 | 53.8 | 52.0 | 47.6 | 42.5 | 37.4 |
| P-10 | 65.2 | 57.3 | 53.8 | 51.9 | 47.6 | 42.8 | 37.1 |
| P-11 | 65.5 | 57.4 | 53.9 | 52.3 | 47.6 | 42.4 | 37.5 |

TABLE 10

Contact angle of ink composition for forming clear layer to recording layer (degree)

|  | Example 1 | Example 2 | Example 3 | Example 4 | Example 5 | Example 6 | Example 7 |
|---|---|---|---|---|---|---|---|
| P-1 | 64.3 | 52.7 | 48.2 | 44.5 | 42.5 | 39.0 | 36.8 |
| P-2 | 65.0 | 53.0 | 50.3 | 47.9 | 43.7 | 40.2 | 36.8 |
| P-3 | 64.8 | 53.6 | 52.8 | 50.3 | 45.1 | 41.8 | 37.0 |
| P-4 | 65.2 | 57.4 | 54.1 | 52.1 | 47.9 | 42.8 | 37.6 |
| P-5 | 68.1 | 62.1 | 55.7 | 54.2 | 50.4 | 46.7 | 41.2 |
| P-6 | 74.2 | 70.5 | 65.5 | 61.8 | 54.8 | 51.2 | 46.1 |
| P-7 | 78.4 | 75.3 | 71.2 | 68.7 | 64.2 | 60.8 | 54.2 |
| P-8 | 65.0 | 57.4 | 54.1 | 52.3 | 48.0 | 42.5 | 37.8 |
| P-9 | 65.1 | 57.1 | 53.8 | 52.0 | 47.6 | 42.5 | 37.4 |
| P-10 | 65.2 | 57.3 | 53.8 | 51.9 | 47.6 | 42.8 | 37.1 |
| P-11 | 65.5 | 57.4 | 53.9 | 52.3 | 47.6 | 42.4 | 37.5 |

TABLE 11

Thick printability of ink composition for forming clear layer (on recording layer)

|  | Example 1 | Example 2 | Example 3 | Example 4 | Example 5 | Example 6 | Example 7 |
|---|---|---|---|---|---|---|---|
| P-1 | / | / | / | / | / | / | / |
| P-2 | — | ○ | ○ | ○ | ○ | ○ | x |
| P-3 | — | ○ | ○ | ○ | ○ | ○ | x |
| P-4 | — | xx | ○ | ○ | ○ | ○ | x |
| P-5 | — | xx | xx | ○ | ○ | ○ | ○ |
| P-6 | — | xx | xx | xx | ○ | ○ | ○ |
| P-7 | — | xx | xx | xx | xx | xx | ○ |
| P-8 | — | xx | ○ | ○ | ○ | ○ | x |
| P-9 | — | xx | ○ | ○ | ○ | ○ | x |
| P-10 | — | xx | ○ | ○ | ○ | ○ | x |
| P-11 | — | xx | ○ | ○ | ○ | ○ | x |

TABLE 12

Contact angle of ink composition for forming clear layer to clear layer (cured product) (degree)

|  | Example 1 | Example 2 | Example 3 | Example 4 | Example 5 | Example 6 | Example 7 |
|---|---|---|---|---|---|---|---|
| Cured product of Example 1 | 57.1 | 51.4 | 46.8 | 45.5 | 42.5 | 40.2 | 37.6 |
| Cured product of Example 2 | 58.4 | 52.1 | 48.7 | 46.4 | 45.0 | 38.7 | 35.0 |
| Cured product of Example 3 | 60.7 | 54.1 | 51.0 | 47.8 | 45.1 | 38.6 | 35.4 |

TABLE 12-continued

Contact angle of ink composition for forming clear layer to clear layer (cured product) (degree)

|  | Example 1 | Example 2 | Example 3 | Example 4 | Example 5 | Example 6 | Example 7 |
|---|---|---|---|---|---|---|---|
| Cured product of Example 4 | 62.8 | 55.2 | 52.6 | 49.4 | 45.7 | 40.2 | 37.0 |
| Cured product of Example 5 | 66.8 | 62.3 | 57.6 | 53.2 | 48.9 | 46.2 | 40.8 |
| Cured product of Example 6 | 71.1 | 67.5 | 62.4 | 58.9 | 51.3 | 49.4 | 44.2 |
| Cured product of Example 7 | 75.4 | 70.5 | 67.1 | 63.2 | 58.7 | 52.3 | 50.0 |

TABLE 13

Printability of ink composition for forming clear layer by solid printing (on clear layer)

|  | Example 1 | Example 2 | Example 3 | Example 4 | Example 5 | Example 6 | Example 7 |
|---|---|---|---|---|---|---|---|
| Cured product of Example 1 | / | / | / | / | / | / | / |
| Cured product of Example 2 | — | ○ | ○ | ○ | ○ | ○ | ○ |
| Cured product of Example 3 | — | ○ | ○ | ○ | ○ | ○ | ○ |
| Cured product of Example 4 | — | ○ | ○ | ○ | ○ | ○ | ○ |
| Cured product of Example 5 | — | x | ○ | ○ | ○ | ○ | ○ |
| Cured product of Example 6 | — | xx | x | ○ | ○ | ○ | ○ |
| Cured product of Example 7 | — | xx | xx | xx | ○ | ○ | ○ |

TABLE 14

Thick printability of ink composition for forming clear layer (on clear layer)

|  | Example 1 | Example 2 | Example 3 | Example 4 | Example 5 | Example 6 | Example 7 |
|---|---|---|---|---|---|---|---|
| Cured product of Example 1 | / | / | / | / | / | / | / |
| Cured product of Example 2 | — | ○ | ○ | ○ | ○ | x | x |
| Cured product of Example 3 | — | ○ | ○ | ○ | ○ | x | x |
| Cured product of Example 4 | — | ○ | ○ | ○ | ○ | x | x |
| Cured product of Example 5 | — | xx | ○ | ○ | ○ | ○ | x |
| Cured product of Example 6 | — | xx | xx | ○ | ○ | ○ | x |
| Cured product of Example 7 | — | xx | xx | xx | ○ | ○ | ○ |

INDUSTRIAL APPLICABILITY

According to the present invention, there can be obtained an ink composition for forming a clear layer excellent in adhesiveness to any of a substrate, a recording layer and a clear layer, and excellent not only in overcoating property but also in refinishing properties at the time of solid coating with a clear layer on a recording layer.

In addition, excellent design characteristics can be imparted to a printed article by performing double coating using the ink composition for forming a clear layer in accordance with the present invention, thereby, raising a specified position on an image to impart three-dimensionality or forming a pattern.

DESCRIPTION OF REFERENCE SIGNS

1 Substrate
2 Recording layer
3a First clear layer
3b Second clear layer

The invention claimed is:
1. A printed article comprising a thick clear layer comprised of at least two clear layers that are directly in contact with each other and the at least two clear layers are formed using an ink composition for forming a clear layer, and the thick clear layer is formed at least on a recording layer which is formed on a substrate, wherein the ink composition for forming a clear layer contains a polymerizable compound consisting of polymerizable compound(s) that can be cured by radical polymerization, a photopolymerization initiator and a surface tension regulator, wherein the polymerizable compound comprises a (meth)acrylate monomer as a monofunctional monomer or a polyfunctional monomer, and oligomers or prepolymers, the recording layer is formed of an ink composition containing a coloring material, a polymerizable compound, a photopolymerization initiator and a surface tension regulator, wherein the polymerizable compound comprises a (meth)acrylate monomer as a monofunctional monomer or a polyfunctional monomer, the substrate is selected from the group consisting of polypropylene which have been subjected to corona discharge treatment, polyethylene terephthalate, polycarbonate, polystyrene, polyvinyl chloride, polyvinylidene chloride, and an acrylonitrile-butadiene-styrene copolymer, the surface free energy of the substrate is 30 to 45 $(mJ/m^2)$, the surface free energy of the recording layer is 40 to 50 $(mJ/m^2)$, the contact angle of the ink composition for forming a clear layer to the substrate is 30 to 65 degrees, the contact angle of the ink composition for forming a clear layer to the recording layer is 40 to 55 degrees, and the contact angle of the ink composition for forming a clear layer to the clear layer is 45 to 60 degrees.

2. The printed article according to claim 1, wherein the surface tension regulator contained in the ink composition for forming a clear layer comprises a silicone compound.

3. The printed article according to claim 2, wherein the silicone compound has an ethylenic double bond in a molecule.

4. The printed article according to claim 1, claim 2, or claim 3, wherein the photopolymerization initiator comprises at least an acylphosphine oxide compound.

5. The printed article according to claim 1, claim 2, or claim 3, wherein the surface free energy of a cured product of the ink composition for forming a clear layer is 40 to 43.4 $(mJ/m^2)$.

6. A method of applying an ink composition for forming a thick clear layer, comprising forming at least two clear layers that are directly in contact with each other and at least on a recording layer on a substrate, wherein the ink composition for forming a clear layer contains a polymerizable compound consisting of polymerizable compound(s) that can be cured by radical polymerization, a photopolymerization initiator and a surface tension regulator, wherein the polymerizable compound comprises a (meth)acrylate monomer as a monofunctional monomer or a polyfunctional monomer, and oligomers or prepolymers, the recording layer is formed of an ink composition containing a coloring material, a polymerizable compound, a photopolymerization initiator and a surface tension regulator, wherein the polymerizable compound comprises a (meth)acrylate monomer as a monofunctional monomer or a polyfunctional monomer, the substrate is selected from the group consisting of polypropylene which have been subjected to corona discharge treatment, polyethylene terephthalate, polycarbonate, polystyrene, polyvinyl chloride, polyvinylidene chloride, and an acrylonitrile-butadiene-styrene copolymer, the surface free energy of the substrate is 30 to 45 $(mJ/m^2)$, the surface free energy of the recording layer is 40 to 50 $(mJ/m^2)$, the contact angle of the ink composition for forming a clear layer to the substrate is 30 to 65 degrees, the contact angle of the ink composition for forming a clear layer to the recording layer is 40 to 55 degrees, and the contact angle of the ink composition for forming a clear layer to the clear layer is 45 to 60 degrees.

7. A method of producing a printed article in accordance with the method of applying an ink composition for forming a clear layer according to claim 6.

8. The printed article according to claim 4, wherein the surface free energy of a cured product of the ink composition for forming a clear layer is 40 to 43.4 $(mJ/m^2)$.

9. The printed article according to claim 1, wherein a specified position on an image is raised to impart three-dimensionality.

10. The printed article according to claim 1, wherein a specified position on an image is raised to form a pattern.

* * * * *